US006978281B1

(12) United States Patent
Kruy et al.

(10) Patent No.: US 6,978,281 B1
(45) Date of Patent: Dec. 20, 2005

(54) VERSIONED PROJECT DATA

(75) Inventors: Steven J. Kruy, Carnation, WA (US); Christopher G. Kaler, Redmond, WA (US); Kenneth D. Hardy, Redmond, WA (US); Martyn S. Lovell, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/717,645

(22) Filed: Nov. 21, 2000

(51) Int. Cl.[7] .............................................. G06F 17/30
(52) U.S. Cl. ................... 707/203; 707/101; 707/104.1; 707/3
(58) Field of Search ............................... 707/203, 102, 707/104, 3

(56) References Cited

U.S. PATENT DOCUMENTS

| | | | | |
|---|---|---|---|---|
| 5,020,122 A | * | 5/1991 | Walsh et al. ................ | 382/236 |
| 5,381,332 A | * | 1/1995 | Wood ............................ | 705/8 |
| 5,761,678 A | * | 6/1998 | Bendert et al. ............ | 707/204 |
| 5,890,166 A | * | 3/1999 | Eisenberg et al. ......... | 707/203 |
| 5,893,091 A | * | 4/1999 | Hunt et al. .................... | 707/10 |
| 5,917,492 A | * | 6/1999 | Bereiter et al. ............ | 345/854 |
| 5,931,904 A | * | 8/1999 | Banga et al. .................. | 341/55 |
| 5,953,729 A | * | 9/1999 | Cabrera et al. ............. | 707/204 |
| 6,016,492 A | * | 1/2000 | Saxton et al. ............... | 707/100 |
| 6,066,930 A | * | 5/2000 | Horiguchi et al. ......... | 318/439 |
| 6,366,930 B1 | * | 4/2002 | Parker et al. ............... | 707/203 |
| 6,393,419 B1 | * | 5/2002 | Novak et al. .................. | 707/8 |

* cited by examiner

*Primary Examiner*—Safet Metjahic
*Assistant Examiner*—Sana Al-Hashemi
(74) *Attorney, Agent, or Firm*—Woodcock Washburn LLP

(57) ABSTRACT

Systems, clients, servers, methods, and computer-readable media of varying scope are described that maintain versions of data related to projects. Included in the system is a visual interface, a source repository and a project database. The source repository maintains versions of source code associated with a software development project. The project database maintains project data associated with the project. The project database maintains versions of the project data. The visual interface provides a mechanism for reading and updating the project data. As project data is updated a method is invoked in which a current version of the data is located. The current version is determined by examining which data structure has an end-time value that is blank or null. The current version's end-time is set to the current time (i.e. the time of the update), thereby turning the current version into a previous version of the project data. A new data structure is created that contains the updated value. The end-time value for the new data structure is set to blank or null, indicating that it is the current version.

21 Claims, 6 Drawing Sheets

VERSIONED PROJECT DATA

RELATED APPLICATIONS

This application is related to the following applications, both of which are filed on the same day and assigned to the same assignee as the present application:

"Versioned Project Data"—Ser. No. 09/717,587, and
"Project Branching"—Ser. No. 09/717,723.

FIELD

The present invention pertains generally to computer software development, and more particularly to maintaining versions of data associated with development projects.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2000, Microsoft, Inc.

BACKGROUND

A typical software development project will involve many different source code modules and files that are being worked on by teams of software developers. In addition, the typical software development project will have a reasonably long life cycle of development, testing, release, and maintenance. In order track changes over time, version control systems have been developed to aid teams of software developers to maintain the often complex code associated with a particular development project. Version control systems of the prior art typically provide versioning only for files and modules comprising the development project.

However, it is frequently the case that during a project, team members desire the ability to refer to project tracking data as it existed at a prior time. Sometimes this is to locate information; sometimes it is to determine the state of the project as it existed at some particular point in time. Furthermore, it is often desirable to determine trends based on how state changes over time. Frequently these types of queries are not planned for when the project is created, and are often ad hoc.

When dealing with project data that is under configuration management, the problem becomes more complex. This is because configuration data needs to be tracked both as a whole, i.e. across all configurations, as well as for each configuration.

Previous systems have generally used one or more of several methods to maintain historical data related to a project. In a first method, a "transcript" is associated with each item. The transcript may include, among other things, the date and time of all changes to the item, including state changes. Frequently the state data is interspersed with textual data in the transcript. However, occasionally the state data is maintained separately.

In a second method used by some systems, the actual data fields aren't tracked, just the update action itself. For example, the fact that an update occurred on a particular date will be tracked, but not the project data fields that were updated.

In a third method, special fields are employed to track the date/time of specific state transitions. For example, one field can indicate a bug was opened, a second field will indicate when the bug was resolved, and a third when the bug was closed.

The first approach suffers in that it cannot be easily queried. The second approach is not viable as a general solution because the actual data is not tracked, just the fact that the data has changed. This makes it impossible to query the actual state of the data on a particular date. The third approach is not viable as a general solution because the number of transition fields becomes impractical and any fields without transition dates cannot be queried for historical data. As well, general historical data is not available because the transition dates record only the last, i.e. most recent transition. All information regarding previous transitions is lost.

In the case of configurations, most systems today support different configurations by "tagging" the data with the associated configuration. In this approach, various entities supported by the system can be tagged (i.e. labeled) with an alphanumeric identifier that identifies a configuration to which the entity belongs. This approach is sub-optimal as information about how similar problems in different configurations relate, or how project data migrates from one configuration to another can be lost.

Therefore, there is a need in the art for a system that maintains versions of project data in a manner that saves all of the previous state of a project, and that can be queried to produce a project's state at a particular point in time.

SUMMARY

The above-mentioned shortcomings, disadvantages and problems are addressed by the present invention, which will be understood by reading and studying the following specification.

The systems and methods presented maintain versions of data related to projects. One aspect of the present invention is a system that includes a visual interface, a source repository and a project database. The source repository maintains versions of source code associated with a software development project. The project database maintains project data associated with the project. The project database also maintains versions of the project data. The visual interface provides a mechanism for reading and updating the project data. As project data is updated, the updates are captured as a new version of the project data. Previous versions of the project data are maintained in the project database.

In a further aspect, a method of maintaining versions of project data is presented. In one aspect of the method, each version of the project data has a start-time and an end-time value associated with it, which defines the time period of the version's existence. The current version can be determined by examining the version data structures for the project data to locate the version data structure having an end-time value that is blank or null. Previous versions can be identified by end-time data that is non-null. As project data is updated, the current version of the data is located. The current version's end-time is set to the current time (i.e. the time of the update), thereby turning the current version into a previous version of the project data. A new data structure is created that contains the update value. The end-time value for the new data structure is set to blank or null and the start-time value is set to the current time, indicating that the new data structure is the current version. Alternatively, a flag in the version data can be used instead of, or in addition to, the start-time and end-time data to indicate which version is the "current" version.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. In the first section, the hardware and the operating environment in conjunction with which embodiments of the invention may be practiced are described. In the second section, a system level overview of the invention is presented. In the third section, methods of an exemplary embodiment of the invention are provided. In the fourth section, a specific exemplary embodiment of the invention is presented. Finally, in the fifth section, a conclusion of the detailed description is provided.

Hardware and Operating Environment

Figure 1:
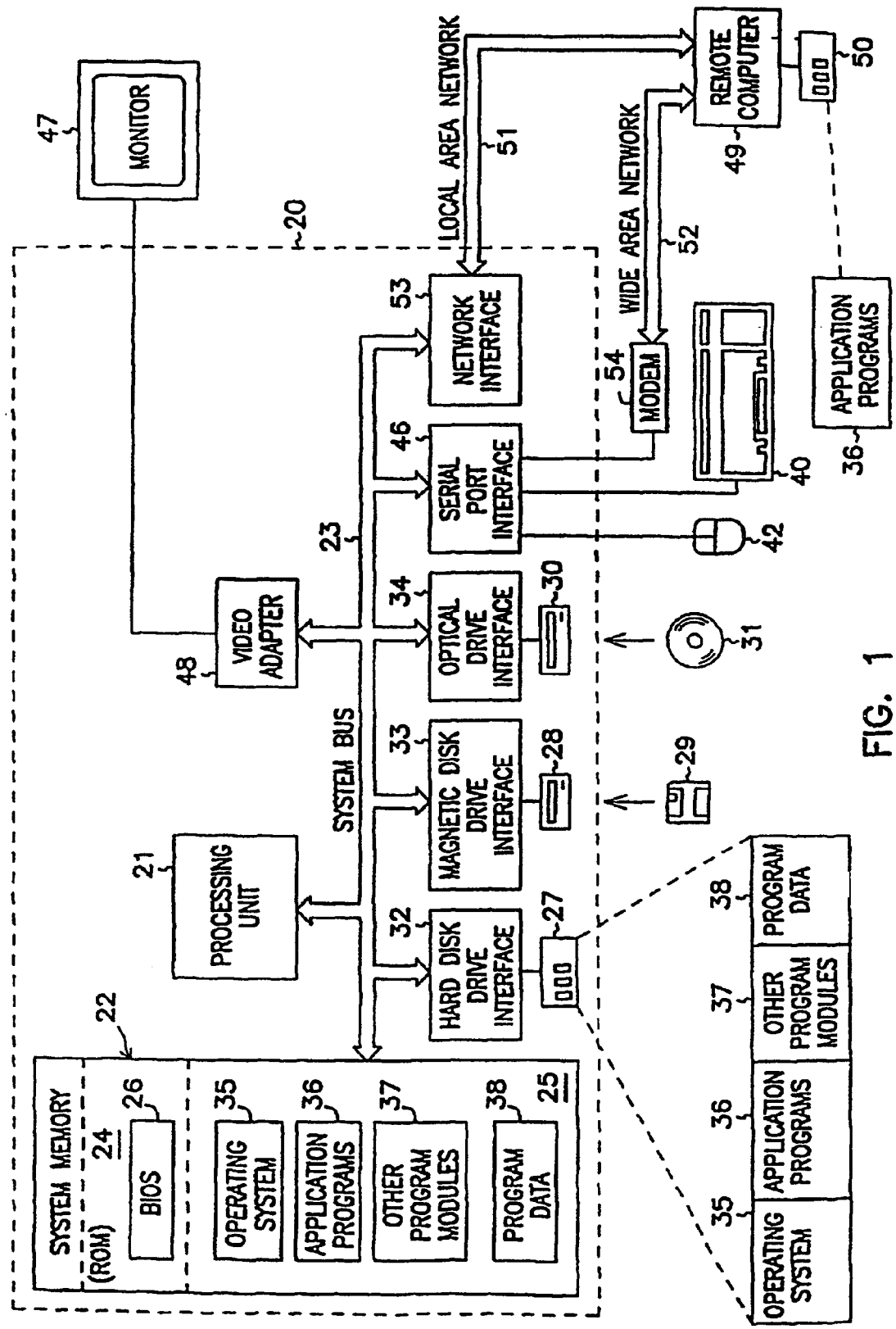
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
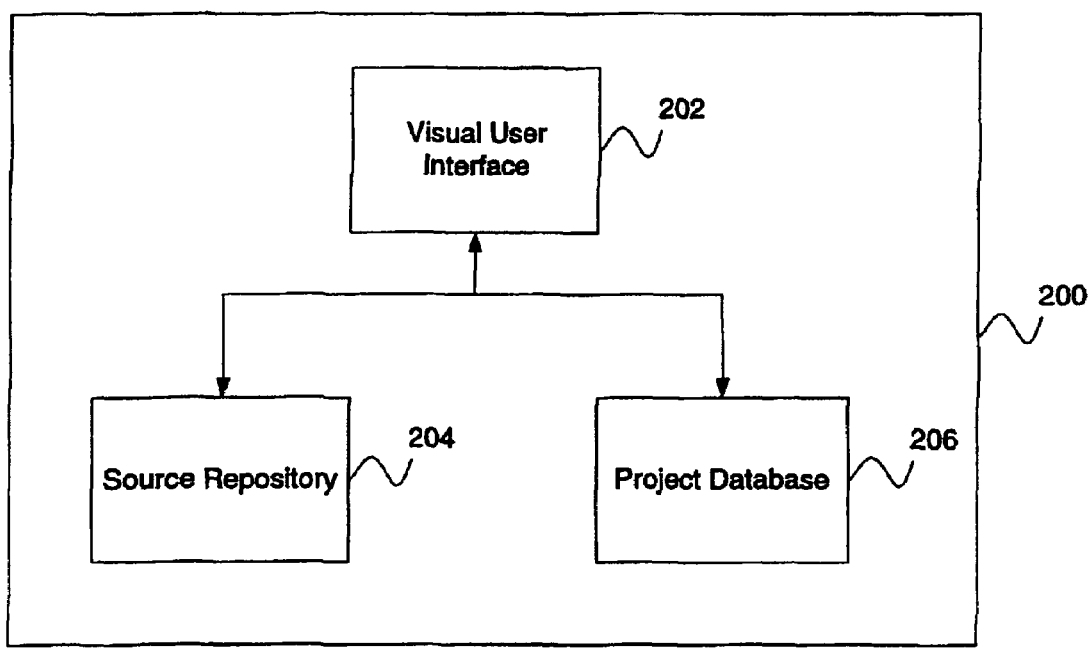
FIG. 2 is a block diagram illustrating a system level overview of a system performing versioning of project data incorporating the present invention.

FIG. 2 illustrates a project data tracking system 200 according to an embodiment of the invention. Project data tracking system 200 includes a user interface component 202, a project database 206, and a source repository component 204. User interface 202 provides a means for a user to interact with system 200. User interface 202 includes windows and screens that provide representations of the data in project database 206 and source repository 204.

System 200, in some embodiments of the invention, includes source repository 204. Source repository 204 provides a repository for storing one or more versions of source code files and other project files, such as associated technical documentation and bug documentation. Source repository 204 associates versions of the source code to one or more projects. These projects can be the same projects for which project data is held in project database 206.

Project database 206 is a database capable of providing persistent storage for project data, including versioned project data. While any database capable of storing and retrieving data can be used, it is desirable that project database 206 be a relational database. Use of a relational database allows complicated SQL queries to be performed that can access and mine the database. In one embodiment of the invention, project database 206 is the SQL Server® database from Microsoft® Corp. In alternative embodiments, the database can be Oracle®, Informix®, or Sybase®. The invention is not limited to any particular database system.

FIG. 2 shows source repository 204 and project database 206 as separate components. However, the invention is not so limited, and in alternative embodiments of the invention, source repository 204 and project database 206 are maintained as a single entity that incorporates the functionality of both the source repository 204 and the project database 206.

Figure 3:
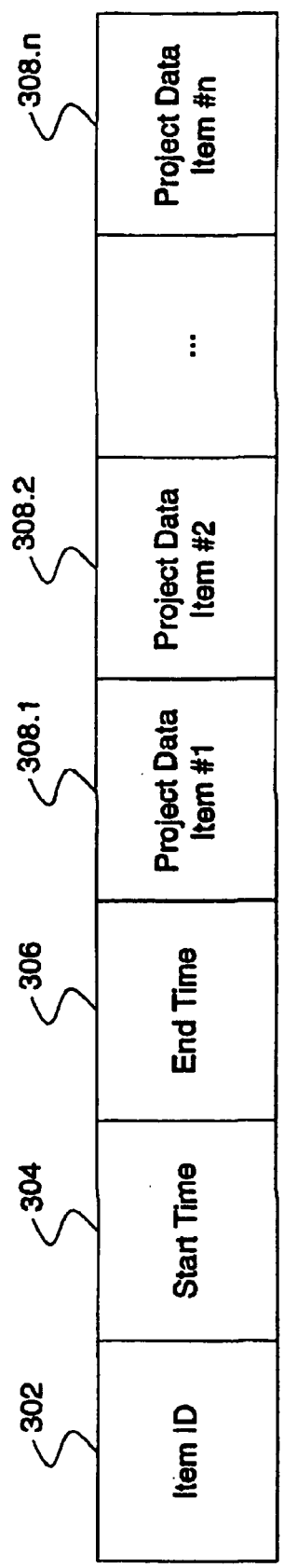
FIG. 3 is a diagram of a data structure according to an embodiment of the invention.

FIG. 3 provides an overview of a data structure 300 maintained in project database 206. Data structure 300 includes an item identification (ID) 302, a start time 304, an end time 306, and one or more project data elements 308. Item ID 302 is a field containing an identifying value that uniquely specifies a particular issue related to a project. The issue can be a software defect (i.e. a "bug"), a task, development milestone, or any other discrete issue that a user wishes to track related to a project.

Project data items 308 contain data that is used to define and describe the issue. Examples of project data include:
  Owner—the party responsible for the issue.
  Priority—the priority indicating when, in relation to other issues, the current issue will be addressed.
  Severity—the severity level of the problem, i.e. what impact does the problem have on users of the system.
  Area—the general area affected by the issue. For example, the area can be a specific application.
  Sub-area—a more specific area affected by the issue. For example a particular feature of an application.
  State—the current state of development of the project. For example, specification, development, testing, release, retired etc.

The data structure 300 represents a particular version of project data associated with a project. Multiple versions of an item are therefore represented by multiple instances of the data structure, each having the same item ID and potentially different project data values 308. The management of the instances of data structure 300 will be described in the next section.

Methods of the Invention

In the previous section, a system level overview of the operation of an exemplary embodiment of the invention was described. In this section, the particular methods of the invention performed by an operating environment executing an exemplary embodiment of the invention are described by reference to a flowchart shown in FIG. 4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 4 is inclusive of the acts required to be taken by an operating environment executing an exemplary embodiment of the invention.

Figure 4:
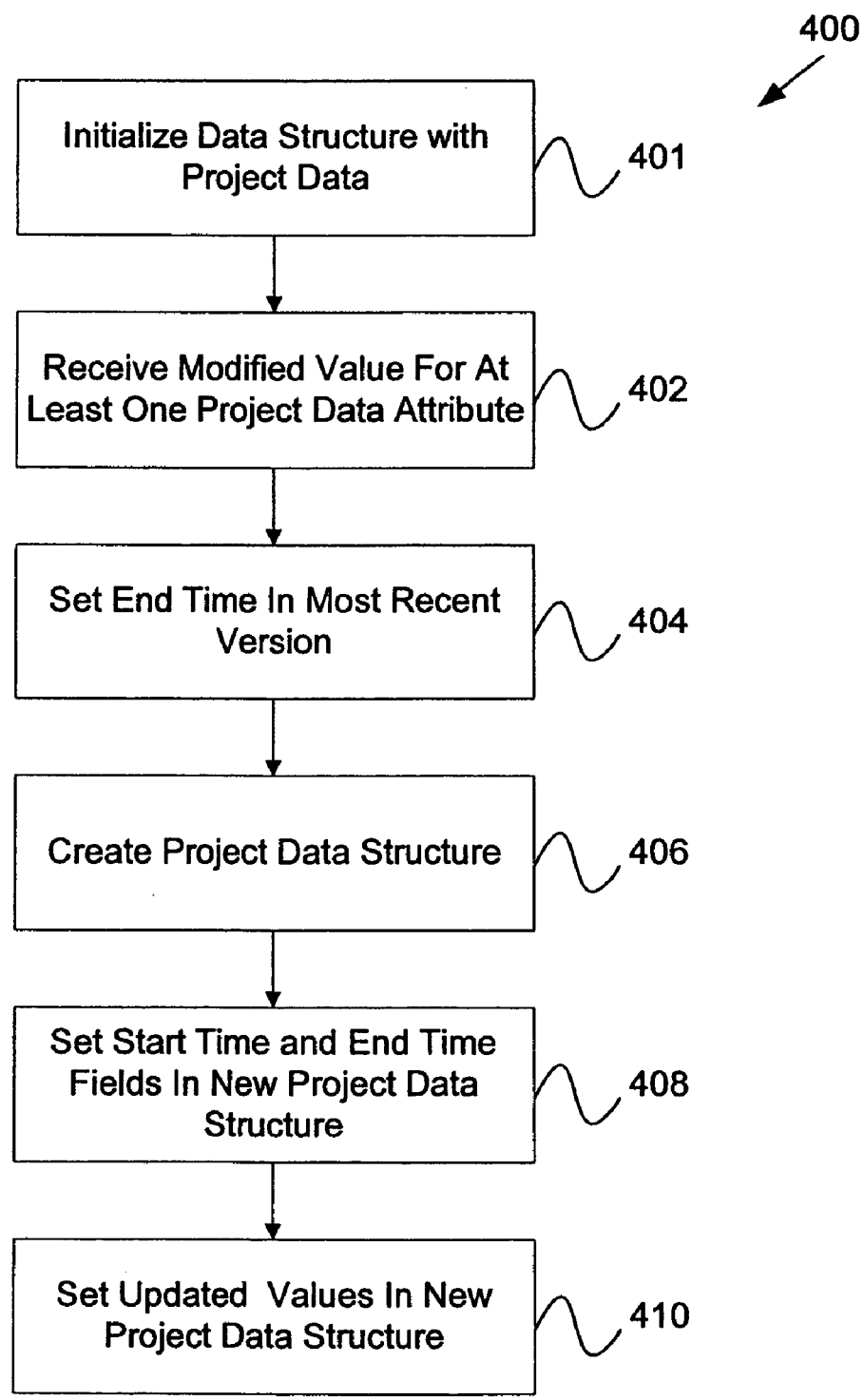
FIG. 4 is a flow chart illustrating one method of operation by which the project data is versioned in embodiments of the invention.

A method 400 for maintaining multiple versions of project data is shown in FIG. 4. The method begins when a program executing the method, such as a project tracking system 200, initializes a first version of the project data (block 401).

Next, the project tracking system receives an update for at least one project data value (block 402). Upon receiving the data value update, the program according to one embodiment of the invention locates the most recent version of the project data using an end-time field, and sets the end time field in the project data structure to the current time (block 404). In one embodiment of the invention, the data structure is a row of a project property table in a relational database, and the most recent version has an end-time field value that is blank. After updating the end-time, the data structure represents a predecessor version of the project data.

Next, the program creates a new project data structure to represent the new current version of the object (block 406). After creating the new project data structure, the program sets the start-time field and the end-time field in the object property data structure representing the new current version (block 408). The start time field is set to the same time value as the end-time value of the project data structure representing the previous version, which in most cases is the current time. The end-time field is set to null in one embodiment of the invention. In alternative embodiments, the end-time value is left blank, or a flag is used to indicate whether or not the project data represents the current version.

Finally, the program sets the property value fields in the successor object to the updated value or values (block 410).

The operation of the systems and methods described above are illustrated in Table 1. Table 1 contains multiple entries for the item having an item identifier of "1234". Each row in the table represents a row in database 206, and contains the item's attributes at various points in time. As described above, whenever any attribute is changed, a new row as represented by an entry in Table 1 is added.

TABLE 1

| Item | Start-Time | End-Time | Status | Priority | Owner | ... |
|------|------------|----------|--------|----------|--------|-----|
| 1234 | 1/1/99 | 1/11/99 | Open | 1 | JDoe | ... |
| 1234 | 1/11/99 | 1/12/99 | Open | 2 | JDoe | ... |
| 1234 | 1/12/99 | 1/13/99 | Fixed | 1 | TSmith | ... |
| 1234 | 1/13/99 | | Closed | 1 | NJones | ... |

The following four examples illustrate various aspects and advantages of the invention. As a first example, assume a user wanted to know how many priority 1 issues, items, or bugs were assigned to "JDoe" on Jan. 12, 1999. Since all of the historical data is present, the system can determine that on Jan. 12, 1999, the item "1234" is listed as a priority "2" bug, and shouldn't be part of the result. This is an example of a "historical" query. That is, a query that based at a specific moment in time.

As a second example assume a user wanted to determine all of the bugs that had their priority lowered. Using the historical data, it is clear that item "1234" would be included in the results. This is an example of a trend analysis query.

A third example of historical data would be the query "determine all the bugs that were assigned to "JDoe" in January 1999 that were considered priority "1" at any time. Using the historical data, the system determines that item "1234" should be included in the results.

A fourth example is a report of the full history of a bug. Using historical data, the bug, and all of the changes to it can be reconstructed.

In the above described systems and methods, versioning of project data has been described. In addition to versioning, the project data can be also be branched. In one embodiment, this is accomplished by including the versioned project data in a set of changes associated with a project branch. A project branch typically occurs when one or more source code files undergo two parallel streams of modifications. For example, one branch may be a continuation of the development process by a first developer, while a second branch is created to allow a bug to be fixed by a second developer. In order to allow the two developers to work on the same file or files simultaneously, a copy of the source exists in each branch. Each developer works on his or her own copy without the need to worry about changes the other developer may be making. The independent changes can be merged back into a single branch at a later time if desired. A second example is a "release" of a project. A release typically comprises a set of particular versions of source code files. A first release will contain a set of files at particular versions, while a second and subsequent release can contain the same set of files, however some of the files will be at different version levels. Further details on the operation of branching are presented in the cofiled, copending United States Patent Application entitled "Project Branching", Ser. No. 09/717,723, which is hereby incorporated by reference herein.

An Exemplary Embodiment of the Invention

Figure 5:
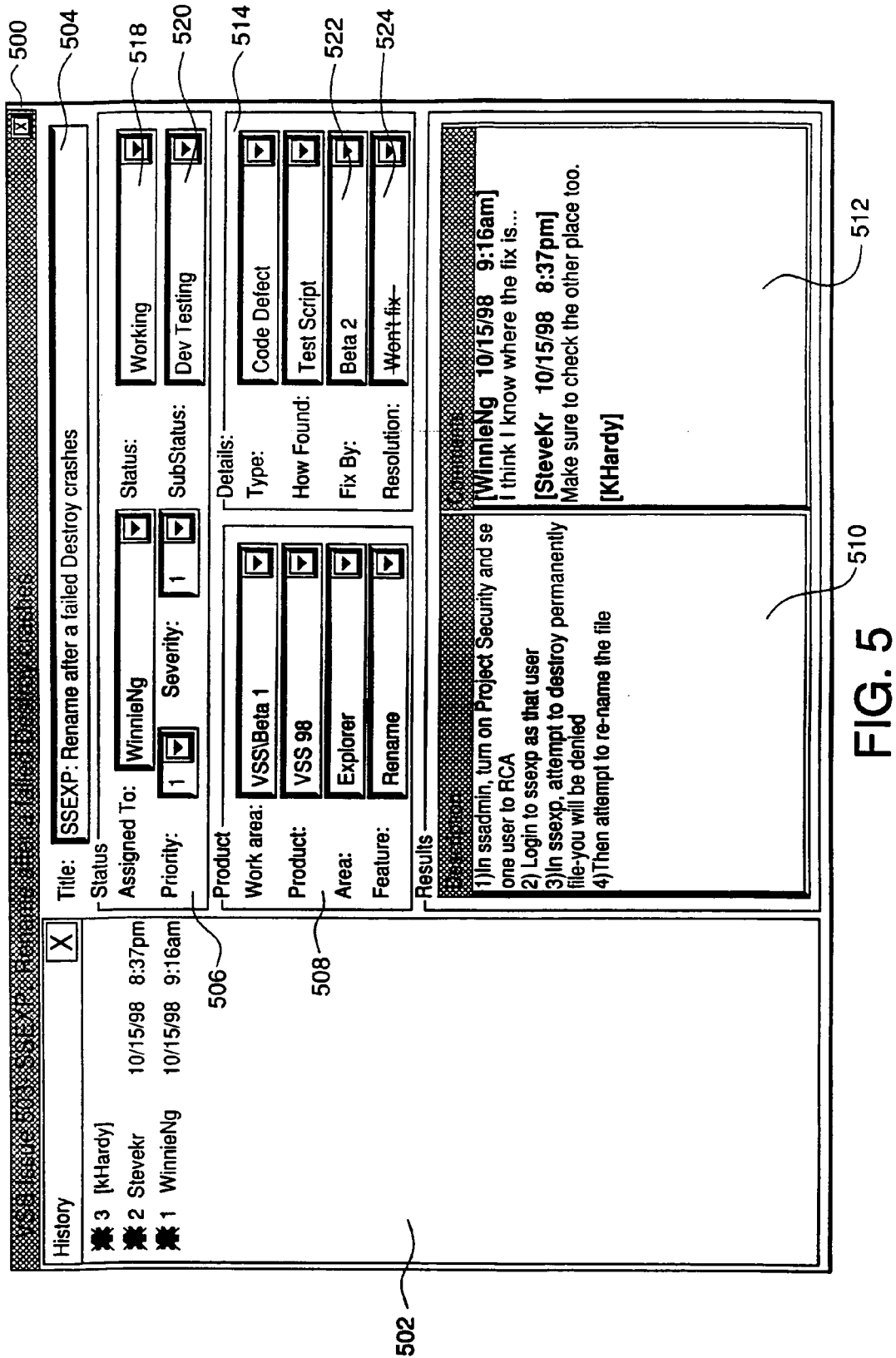
FIG. 5 is an exemplary screen diagram according to an embodiment of the invention.

FIG. 5 illustrates an exemplary user interface screen 500 according to one embodiment of a project data tracking system 200 executing on computer 100. The user interface screen 500 presents to a user the various fields maintained by the data structures described above in reference to FIG. 3. Included in the exemplary screen 500 are history pane 502, title 504, status pane 506, product pane 508, details pane 514, description pane 510, and comments pane 512.

History pane 502 presents information regarding the change history of the data. In one embodiment of the invention, a list of versions of a project issue are presented in the pane, along with data identifying the owner of the change and a date the change was made. When a specific version is selected, the project database 206 is queried for the versioned project data associated with the issue. This data is used to populate fields in the various panes of the screen 500. In one embodiment, the data displayed in the various panes will be the data as it existed for the currently selected version of the issue. In an alternative embodiment, when multiple versions are selected, a comparison of the versions is displayed in a central window, providing a convenient and simple way to see the evolution of the project data over time.

Furthermore, in one embodiment of the invention, the user interface (UI) "form" used to display the versioned data can itself be versioned and stored in the project data store 206. This provides a mechanism for historical bugs or issues to be presented using the version of the form as it existed at the time the issue was created. The changes to a form can comprise new data fields, deletion of data fields, or changes in the position of data fields. In an alternative embodiment of the invention, the current form is displayed, and form changes from previous versions of the form (fields shown or hidden) are highlighted. In yet another embodiment, fields that are different from the current value are also highlighted. Project data can be thought of raw data which has been 'formatted' according to metadata describing rules related to the data. Project data includes both the raw data, and the metadata. Over the course of a real-world project not only does the data change, but also the metadata typically changes too. If users are unable to view the old data in the context of the old metadata, they will be unable to make sense of it. Additionally, if the metadata contains validation rules for the data, the data may actually seem to be invalid. By versioning both the data and the metadata, embodiments of the invention provide the advantage the data is viewed in the context of the metadata as it exists for the corresponding version of the data.

The title 504 indicates the title of the currently selected issue. Issues such as bugs, development features, and tasks are typically assigned a brief title that provides an indication of what the issue is about.

Status pane 506 provides data regarding the status of a particular version of the issue. This data includes the owner (or "assigned to") field indicating the party responsible for the issue, the priority of the issue, the severity of the issue, the status of the issue, and a sub-status of the issue. The priority indicates when, in relation to other issues, the currently selected issue should be addressed. The priority thus provides a ranking of the issue in relation to other issues. The severity field provides an indication of the severity of the issue. For example, if the issue is a software bug, the severity can be used to indicate whether the system is totally unusable, whether the system is usable with a large degree of inconvenience, or whether the problem is merely cosmetic with no impact on system performance. The status field provides an indication of the current status of the software, i.e. whether the software is working or not. The sub-status field provides further details regarding the status. For example, the sub-status field can provide the state of the project in the project life cycle. The invention is not limited to the fields described above, and other fields are possible and within the scope of the invention.

Product pane 508 provides data about a product that the issue relates to. In one embodiment of the invention, product pane 508 includes a work area field, a product field, an area field, and a feature field. The work area field represents the project branch to which the version of the bug or issue is associated. For example, a bug can be fixed in the branch containing version 1.1, but still open in the branch containing version 2.0. The product field provides the name of the product. The area field provides a general area within the product, and the feature field provides a particular feature within the area of the product.

Detail pane 514 provides data related to the issue itself. In one embodiment of the invention, detail pane 514 includes fields indicating the issue type, how the issue was discovered, when the issue must be addressed, and the current resolution status of the issue. The type of issue indicates whether the issue is a development task, a software bug (i.e. code defect), a desired feature, etc. The resolution field indicates how the issue was resolved. For example, the issue can be fixed, a workaround can be provided, a fix can be pending, or no fix may be provided if the issue was in reality a user error as opposed to a system error.

Description pane 510 provides data that gives a more detailed description of the issue than that given in the title 504. The detailed description can be a text description of the steps to take to cause a software error to occur, or the detailed description can be a textual description of a desired feature.

Comments pane 512 provides data related to comments that can be provided by a user each time a new version of the project data is created. Typically, the comments will be related to why the version was created, or how the issue was resolved. In one embodiment of the invention, the comments from each previous version are visible, separated by the name of the user who entered them and the date and time they were added. This view of the historical comments is available even when the history pane is not displayed.

The data fields described above are further examples of the fields that can exist in data structure 300 (FIG. 3). As those of skill in the art will appreciate, the invention is not limited to those fields described above, and further that different display fields and groupings of display fields are possible and within the scope of the invention. Furthermore, the invention is not limited to the panes described above, and in one embodiment of the invention, the panes displayed on screen 500 are customizable.

A further aspect of the embodiments of the invention illustrated in FIG. 5 is the indication of changes to the various fields. In one embodiment of the invention, every field that has been modified in some way since the issue was initially created has a highlighted background. In the exemplary screen shown in FIG. 5, the sub-status field 520, fix-by field 522, and resolution field 524 have all been modified since their initial creation. In one embodiment of the invention, a field that has been modified has a yellow background, while a field that has not been modified has a white background. Those of skill in the art will appreciate that various combinations of colors and gray scales can be used to indicate modified and non-modified fields.

In addition to the background highlighting, the modified fields have other attributes indicating the type of modification. For example, in one embodiment of the invention, a field that has a different value from a previous version is displayed with a highlighted background and normal text. This is illustrated in FIG. 5 by the sub-status field 520. The sub-status field 520 has a different value in a previous version, and was changed to "Dev Testing" in the currently selected version.

As a further example, if a field is empty or blank in the currently selected version, and had a value in a previous version, the previous value will be displayed with a strikethrough font. In one embodiment of the invention, the field will have red text on the yellow background. This is illustrated in FIG. 5 by the resolution field 524.

As a still further example, if a field was empty in the selected version but has a value in a later version, the value will appear in boldface type. In one embodiment of the invention, the field will have red text on a yellow background. This is illustrated in FIG. 5 by the fix-by field 522.

In an alternative embodiment of the invention, the attributes described above can be customized. For example, the highlighting, fonts, and font characteristics can all be altered according to a user's preferences.

In a further alternative embodiment of the invention (not shown), change bars (also referred to as revision bars) are displayed to indicate that fields have been modified. For example, if a line of text in the description field was modified, and change bar is placed alongside the modified line. The change bar can be in addition to the highlighting described above.

In a still further embodiment of the invention, required fields are also highlighted. In one embodiment, the highlighting comprises "red squiggles" placed underneath the required field. In alternative embodiments highlighting a field comprises blinking the field, or displaying a glyph or icon beside the selected property.

The set of required fields can vary, because whether or not a first field is a required can be dependent on the value of a second field. In a still further embodiment of the invention, the combination of fields displayed in the panes of screen 500 described above can vary depending on the data values of one or more fields.

Figure 6:
FIG. 6 is an exemplary tool tip according to an embodiment of the invention.

A tool tip displayed in some embodiments of the invention is illustrated in FIG. 6. In these embodiments of the invention, the user may hover a cursor 601 for a pointing device over a field with revisions marked in the manner described above in order to obtain more information about what has changed. In this case, a tool tip 600 is displayed containing the previous value of the field 602 and the current value 604 of the field. Values that are too long to be displayed in a tool tip can be abbreviated (using ellipses) at the end of the tool tip.

CONCLUSION

Maintaining versions of project data has been described. As those of skill in the art will appreciate, the embodiments of the invention provide advantages not found in previous systems. For example, the system and methods of the invention provide a mechansims for a user to perform efficient, and simple historical and temporal analysis of project data. In addition, the system allows a user to perform trend-analysis based on versions of the project data.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while maintaining versions of project data has been described in terms of an a relational, other means of storing persistent objects can be readily substituted. For example, the project version data could be stored in an object oriented database. The terminology used in this application is meant to include all of these environments. Therefore, it is manifestly intended that this invention be limited only by the following claims and equivalents thereof.

We claim:

1. A computerized method for maintaining versions of project data, the project data, having at least one project data attribute, the method comprising:
receiving an updated value for the project data attribute;
saving a previous version of the project data in a first data structure, wherein the previous version contains a value of the at least one project data attribute prior to the update, and wherein an end time field is said first data structure is set to a value corresponding to a current time; and
creating a current version of the project data in a second data structure, wherein the current version of the project data contains the updated value, and wherein said creation of a current version comprises (a) creating said second data structure; (b) setting a start tine field in the second data structure to a value comprising the current time used to set the end time field of the first data structure; and (c) setting an end time field in the second data structure to a value representing a most recent version of the object.

2. The computerized method of claim 1, further comprising setting a property value field to the updated value.

3. The computerized method of claim 1, wherein the value representing the most recent value is a blank value.

4. The computerized method of claim 1, wherein the value representing the most recent value is a null value.

5. The computerized method of claim 1, wherein the data structure comprises at least one row in a database.

6. The computerized method of claim 1, wherein the database is a relational database.

7. A compute readable medium having computer-executable instructions for maintaining versions of project data, the project data, having at least one project data attribute said computer-executable instructions performing a method comprising:
receiving an updated value for the project data attribute;
saving a previous version of the project data in a first data structure, wherein the previous version contains a value of the at least one project data attribute prior to the update, and wherein an end time field is said first data structure is set to a value corresponding to a current time; and
creating a current version of the project data in a second data structure, wherein the current version of the project data contains the updated value, and wherein said creation of a current version comprises (a) creating said second data structure; (b) setting a start tine field in the second data structure to a value comprising the current time used to set the end time field of the first data structure; and (c) setting an end time field in the second data structure to a value representing a most recent version of the object.

8. The computer-readable medium of claim 7, further comprising setting a property value field to the updated value.

9. The computer-readable medium of claim 7, wherein the value representing the most recent value is a blank value.

10. The computer-readable medium of claim 7, wherein the value representing the most recent value is a null value.

11. The computer-readable medium of claim 7, wherein the data structure is at least one row in a database.

12. The computer-readable medium of claim 7, wherein the database is a relational database.

13. A computerized system comprising:
a processor and a computer-readable medium;
an operating environment executing on the processor from the computer-readable medium; and
a project tracking system operative to maintain versions of project data comprising at least one project data element, wherein said project tracking system updates said project data elements by: (i) saving a previous version of the project data in a first data structure, wherein the previous version contains a value of the at least one project data attribute prior to the update, and wherein an end time field in said first data structure is set to a value corresponding to a current time; and (ii) creating a current version of the project data in a second data structure, wherein the current version of the project data contain the updated value, and wherein said creation of a current version comprises (a) creating said a second data structure; (b) setting a start time field in the second data structure to a value the current time; and (c) setting an end time field in the second data structure to a value representing a most recent version of the object.

14. The computerized system of claim 13, wherein the project tracking System comprises:
a visual interface operative to display the project data and receive an update to the project data element; and a project database operative to store a new version of project data upon receipt of an update to the project data element.

15. The computerized system of claim 14, wherein the project database is a relational database.

16. A computerized method for maintaining versions of project data, the project data having at least one project data attribute, said computer-executable instructions performing a method comprising:

receiving an updated value for the project data attribute;

saving a previous version of the project data in a first data structure wherein said previous version contains at least one value, each of said at least one value corresponding to said at least one project data attribute prior to the update, said previous version further comprising user interface information corresponding to a user interface used to display said at least one value; and wherein an end time field is said first data structure is set to a value corresponding to a current time; and creating a current version of the project data in a second data structure, wherein the current version of the project data contain the updated value, and wherein said creation of a current version comprises (a) creating said second data structure; (b) setting a start tine field in the second data structure to a value comprising the current time used to set the end time field of the first data structure; and (c) setting an end time field in the second data structure to a value representing a most recent version of the object.

17. The computerized method of claim 16, further comprising setting a property value field to the updated value.

18. A compute readable medium having computer-executable instructions for maintaining version of project data, the project data, having at least one project data attribute, said computer-executable instructions performing a method comprising:

receiving an updated value for the project data attribute;

saving a previous version of the project data in a first data structure, wherein the previous version contains at least one value, each of said at least one value corresponding to said at least one project data attribute prior to the update, said previous version further comprising user interface information corresponding to a user interface used to display said at least one value; and wherein an end time field is said first data structure is set to a value corresponding to a current time; and creating a current version of the project data in a second data structure, wherein the current version of the project data contains the updated value, and wherein said creation of a current version comprises (a) creating said second data structure; (b) setting a start time field in the second data structure to a value the current time; and (c) setting an end time field in the second data structure to a value representing a most recent version of the object.

19. A compute-readable medium of claim 18, further comprising setting a property value field to the updated value.

20. A computerized system comprising:

a processor and a computer-readable medium;

an operating environment executing on the processor from the computer-readable medium; and a project tracking system operative to maintain versions of project data comprising at least one project data element, wherein said project tracking system updates said project data elements by: (i) saving a previous version of the project data in a first data structure, wherein the previous version contains a value of the at least one project data attribute prior to the update, and wherein an end time field in said first data structure is set to a value corresponding to a current time; and (ii) creating a current version of the project data in a second data structure, wherein the current version of the project data contain the updated value, and wherein said creation of a current version comprises (a) creating said a second data structure; (b) setting a start time field in the second data structure to a value the current time; and (c) setting an end time field in the second data structure to a value representing a most recent version of the object.

21. The computerized system of claim 20, wherein the project tracking system comprises:

a visual interface operative to display the project data according to said user interface information, and to receive an update to the project data element; and a project database operative to store a new version of project data upon receipt of an update to the project data element.

* * * * *

UNITED STATES PATENT AND TRADEMARK OFFICE
CERTIFICATE OF CORRECTION

PATENT NO. : 6,978,281 B1
APPLICATION NO. : 09/717645
DATED : December 20, 2005
INVENTOR(S) : Steven J. Kruy et al.

It is certified that error appears in the above-identified patent and that said Letters Patent is hereby corrected as shown below:

In column 7, line 64, delete ""before "determine".

In column 8, line 10, delete "undergo" and insert -- undergoes --, therefor.

In column 11, line 24, delete "mechansims" and insert -- mechanisms --, therefor.

In column 11, line 60, in Claim 1, delete "start tine" and insert -- start time --, therefor.

In column 12, line 9, in Claim 7, delete "compute readable" and
insert -- computer-readable --, therefor.

In column 12, line 25, in Claim 7, delete "start tine" and insert -- start time --, therefor.

In column 12, line 65, in Claim 14, delete "System" and insert -- system --, therefor.

In column 13, line 24, in Claim 16, delete "start tine" and insert -- start time --, therefor.

In column 13, line 32, in Claim 18, delete "compute readable" and
insert -- computer-readable --, therefor.

In column 14, line 10, in Claim 19, delete "compute-readable" and
insert -- computer-readable --, therefor.

Signed and Sealed this

First Day of September, 2009

David J. Kappos
*Director of the United States Patent and Trademark Office*